US010305868B2

(12) United States Patent
Evans et al.

(10) Patent No.: US 10,305,868 B2
(45) Date of Patent: May 28, 2019

(54) STREAM SPLITTING MOVING TARGET DEFENSE (71) Applicant: UCHICAGO ARGONNE, LLC, Chicago, IL (US)

(72) Inventors: Nathaniel Evans, Orland Hills, IL (US); Michael Thompson, Chicago, IL (US)

(73) Assignee: UChicago Argonne, LLC, Chicago, IL (US)

( * ) Notice: Subject to any disclaimer, the term of this patent is extended or adjusted under 35 U.S.C. 154(b) by 126 days.

(21) Appl. No.: 15/282,875

(22) Filed: Sep. 30, 2016

(65) Prior Publication Data
US 2018/0097784 A1 Apr. 5, 2018

(51) Int. Cl.
H04L 29/06 (2006.01)

(52) U.S. Cl.
CPC ...... *H04L 63/0464* (2013.01); *H04L 63/1441* (2013.01); *H04L 63/166* (2013.01); *H04L 65/605* (2013.01); *H04L 69/16* (2013.01)

(58) Field of Classification Search
CPC ............. H04L 63/0464; H04L 63/1441; H04L 63/166; H04L 65/4069; H04L 69/16; H04L 45/24; H04L 65/605
USPC ........................................................ 713/151
See application file for complete search history.

(56) References Cited

U.S. PATENT DOCUMENTS

| 7,697,420 B1* | 4/2010 | Garahi .................... H04L 45/00 370/229 |
| 2002/0120874 A1* | 8/2002 | Shu ...................... G06F 11/1076 726/26 |
| 2004/0025018 A1* | 2/2004 | Haas ....................... H04L 45/26 713/168 |
| 2011/0142156 A1* | 6/2011 | Haartsen ................ H04B 1/406 375/271 |
| 2014/0289867 A1 | 9/2014 | Bukai |
| 2016/0065612 A1 | 3/2016 | Evans et al. |

OTHER PUBLICATIONS

"National Cyber Leap Year Summit 2009: Co-Chairs' Report," The Networking and Information Technology Research and Development Program, 58 pages (2009).
Albrechtsen, "A qualitative study of users' view on information security," Computers & Security 26(4), pp. 276-289 (2007).
(Continued)

*Primary Examiner* — Yogesh Paliwal
(74) *Attorney, Agent, or Firm* — Foley & Lardner LLP (57) ABSTRACT Systems and methods for utilizing stream splitting Moving Target Defense (MTD) to provide enhanced computer system communication system security by splitting a data stream in to a plurality of paths is described. In some implementations, Stream splitting MTD, involves splitting a single data stream (e.g., TCP stream) into a plurality of discrete units, then sending and receiving those discrete units from and to different (ideally geographically disparate) receiving servers, with the stream being reassembled on the receiving end. The plurality of discrete units of data include resequencing data. The size of each discrete unit may vary depending on the specific implementation, even down to small unit sizes (e.g., a single packet).

15 Claims, 6 Drawing Sheets (56) References Cited

OTHER PUBLICATIONS

Al-Shaer, "Toward Network Configuration Randomization for Moving Target Defense," Advances in Information Security 54, Moving Target Defense, pp. 153-159 (2011).
Al-Shaer, et al., "Random Host Mutation for Moving Target Defense," Lecture Notes of the Institute for Computer Sciences, Social Informatics and Telecommunications Engineering 106, Security and Privacy in Communication Networks: SecureComm 2012, 18 pages (2013).
Arbor Networks, "The Growing Threat of Application-Layer DDoS Attacks," 20 pages (2012).
Azab & Eltoweissy, "CyberX: A biologically-inspired platform for cyber trust management," Collaborative Computing: Networking, Applications and Worksharing (CollaborateCom), pp. 655-663 (2012).
Azab, et al., "ChameleonSoft: A Moving Target Defense System," 7th International Conference on Collaborative Computing: Networking, Applications and Worksharing, pp. 241-250 (2011).
Beraud, et al., "Using cyber maneuver to improve network resiliency," Military Communications Conference, pp. 1121-1126 (2011).
Boyd & Keromytis, "SQLrand: Preventing SQL Injection Attacks," ACNS: International Conference on Applied Cryptography and Network Security, pp. 292-302 (2004).
Christodorescu, et al., "End-to-End Software Diversification of Internet Services," Advances in Information Security 54, Moving Target Defense, pp. 117-130 (2011).
Colbaugh & Glass, "Predictability-oriented defense against adaptive adversaries," IEEE International Conference on Systems, Man, and Cybernetics, pp. 2721-2727 (2012).
Colbaugh & Glass, "Proactive defense for evolving cyber threats," Intelligence and Security Informatics, Proceedings of 2011 IEEE International Conference on Intelligence and Security Informatics, 6 pages (2011).
Cox, et al., "N-variant systems: a secretless framework for security through diversity: Defense Technical Information Center," USENIX Association, Security '06: 15th USENIX Security Symposium, pp. 105-120 (2006).
Cui & Stolfo, "Symbiotes and defensive Mutualism: Moving Target Defense," Advances in Information Security 54, Moving Target Defense, pp. 99-108 (2011).
Dsouza, et al., "Resilient Dynamic Data Driven Application Systems (rDDDAS)," Procedia Computer Science 18, pp. 1929-1938 (2013).
Dunlop, et al., "MT6D: A Moving Target IPv6 Defense," Military Communications Conference, pp. 1321-1326 (2011).
Evans, et al., "Effectiveness of moving target defenses," Advances in Information Security 54, Moving Target Defense, pp. 29-48 (2011).
Furnell, "Why users cannot use security," Computers & Security 24(4), pp. 274-279.
Groat, et al., "Using an IPv6 moving target defense to protect the Smart Grid. Innovative Smart Grid Technologies," IEEE PES Innovative Smart Grid Technologies, 7 pages (2012).
Groat, et al., "Using dynamic addressing for a moving target defense," Proceedings of the 6th International Conference on Information Warfare and Security, pp. 84-91 (2011).
Haas, et al., "Machine-oriented biometrics and cocooning for dynamic network defense," Proceedings of the Eighth Annual Cyber Security and Information Intelligence Research Workshop, art. No. 33, 4 pages (2013).

Huang & Ghosh, "Introducing Diversity and Uncertainty to Create Moving Attack Surfaces for Web Services," Advances in Information Security 54, Moving Target Defense, pp. 131-151 (2011).
Jackson, et al., "Compiler-Generated Software Diversity," Advances in Information Security 54, Moving Target Defense, pp. 77-98 (2011).
Jackson, et al., "Diversifying the Software Stack Using Randomized NOP Insertion," Advances in Information Security 100, Moving Target Defense II, pp. 151-173 (2012).
KC, et al., "Countering code-injection attacks with instruction-set randomization," Proceedings of the 10th ACM conference on Computer and communications security, pp. 272-280 (2003).
Kewley, et al., "Dynamic approaches to thwart adversary intelligence gathering," Proceedings of the DARPA Information Survivability Conference & Exposition II, 10 pages (2001).
Le Goues, et al., "Moving Target Defenses in the Helix Self-Regenerative Architecture," Advances in Information Security 100, Moving Target Defense II, pp. 117-149 (2012).
Lyon, "Nmap Network Scanning: The Official Nmap Project Guide to Network Discovery and Security Scanning," Insecure.Com LLC, 434 pages (2008).
Nguyen-Tuong, et al., "On the effectiveness of the metamorphic shield," Proceedings of the Fourth European Conference on Software Architecture: Companion Volume, pp. 170-174 (2010).
Nguyen-Tuong, et al., "Security through redundant data diversity," IEEE International Conference on Dependable Systems and Networks With FTCS and DCC, pp. 187-196 (2008).
Phatak, "Spread-Identity mechanisms for DOS resilience and Security," First International Conference on Security and Privacy for Emerging Areas in Communications Networks, 12 pages (2005).
Phatak, et al., "Spread Identity: A new dynamic address remapping mechanism for anonymity and DDoS defense," Journal of Computer Security 21(2), pp. 233-281 (2013).
Portokalidis & Keromytis, "Global ISR: Toward a Comprehensive Defense Against Unauthorized Code Execution," Advances in Information Security 54, Moving Target Defense, pp. 49-76 (2011).
Rinard, "Manipulating Program Functionality to Eliminate Security Vulnerabilities," Advances in Information Security 54, Moving Target Defense, pp. 109-115 (2011).
Roeder & Schneider, "Proactive obfuscation," ACM Transactions on Computer Systems 28(2), art. No. 4, 54 pages (2010).
Scandariato & Knight, "The design and evaluation of a defense system for Internet worms," Proceedings of the 23rd IEEE International Symposium on Reliable Distributed Systems, pp. 164-173 (2004).
Shi, et al., "Full Service Hopping for Proactive Cyber-Defense," IEEE International Conference on Networking, Sensing and Control, pp. 1337-1342 (2008).
Shi, et al., "Port and Address Hopping for Active Cyber-Defense," PAISI: Pacific-Asia Workshop on Intelligence and Security Informatics, pp. 295-300 (2007).
Stanton, et al., "Analysis of end user security behaviors," Computers & Security 24(2), pp. 124-133 (2005).
U.S. Notice of Allowance dated Nov. 18, 2015.
US Office Action dated Aug. 21, 2015.
Yackoski, et al., "Applying Self-Shielding Dynamics to the Network Architecture," Advances in Information Security 100, Moving Target Defense II, pp. 97-115 (2012).
Zank, "Moving Target Defense," Coronado Group, 6 pages (2012).
Zhuang, et al., "Simulation-based Approaches to Studying Effectiveness of Moving-Target Network Defense," National Symposium on Moving Target Research, 12 pages (2012).

* cited by examiner

STREAM SPLITTING MOVING TARGET DEFENSE

STATEMENT OF GOVERNMENT INTEREST

The U.S. Government has rights in this invention pursuant to Contract No. DE-AC-02-06CH11357 between the U.S. Government and the UChicago Argonne, LLC representing Argonne National Laboratory.

FIELD

The present disclosure relates generally to systems that thwart cyber-attacks and data theft by employing moving target defense ("MTD" hereafter). In particular, the disclosure relates to systems that utilize a stream splitting environment MTD to counter cyber-attack attempts and network sniffing, data acquisition attempts.

BACKGROUND

Cyber-attacks continue to pose a major threat to computing systems. Some attacks utilize unauthorized capture of data including network data. TCP/IP packets, for instance, contain data required for two network interfaces to communicate including source and destination IP addresses, ports, protocol type, etc. Unauthorized individuals may gain useful information on who is communicating and what is being communicated by intercepting packets at various levels and locations during the transit of the packets.

SUMMARY

Stream splitting MTD is a dynamic network defense designed to improve data integrity and confidentiality on hostile or potentially hostile networks. One implementation of a method of stream splitting MTD comprises receiving a data transaction that is to be transmitted securely according to a secure transmission instruction associated with the data transaction to a second computing system. A plurality of paths is identified, each containing one or more nodes, each of the paths allowing for data transmission to the second computing system. The data transmission is split in to a plurality of data payloads, some of the data payloads containing resequencing data to help construct the data from the data transaction. One or more of the data payloads are transmitted to the second computing system using each of the plurality of paths. The method may further comprise encrypting each of the plurality of data payloads prior to transmitting the one or more of the plurality of data payloads to the second computing system and receiving an acknowledgement verifying the integrity of a reconstruction of the data transmission using cryptographic authentication. The method may further comprise randomizing the plurality of data payloads and grouping the randomized plurality of data payloads into sets, each of the one or more of the plurality of data payloads transmitted to the second computing system one of the sets. The method may further comprise detecting one of the plurality of paths has unrecoverable losses and removing the path having losses. The data payload using that path is then retransmitted on one of the other paths or a new path. The method may further comprise automatically transmitting test data using the one of the plurality of paths consequent to detecting the one of the plurality of paths has unrecoverable losses, receiving an acknowledgment of the integrity of the test data from the second computing system and re-adding the path being tested to the plurality of paths consequent to receiving the acknowledgement.

Another implementation relates to a system with one or more processors and data storage storing instructions, that when executed by the one or more processors, enables the system to execute the method in the above implementation.

Another implementation relates to non-transitory computer-readable storage media storing instructions that, when executed by one or more processors of a computing system, enables the computing system to execute the method in the above implementation.

These and other advantages and features of the invention, together with the organization and manner of operation thereof, will become apparent from the following detailed description when taken in conjunction with the accompanying drawings.

DETAILED DESCRIPTION

Referring to the figures generally, systems and methods for utilizing stream splitting MTD to provide enhanced computer system communication system security by splitting a data stream in to a plurality of paths is described. Stream splitting MTD helps ensure confidentiality and integrity protection for communications channels. The use of redundant links in the systems and methods or utilizing stream splitting MTD allows for constant uptime testing as well as seamless failover for any compromised or degraded communications links. In some implementations, the split streams utilize a plurality of channels in a single medium (e.g., over the internet). This may be referred to as TCP SS-MTD. In other implementations, the split streams utilize a plurality of mediums. This may be referred to as MM SS-MTD. In some implementations, a combination of channels as well as mediums is utilized. In some implementations, Stream splitting MTD, involves splitting a single data stream (e.g., TCP stream) into a plurality of discrete units, then sending and receiving those discrete units from and to different (ideally geographically disparate) receiving servers, with the stream being reassembled on the receiving end. The plurality of discrete units of data include resequencing data. The size of each discrete unit may vary depending on the specific implementation, even down to small unit sizes (e.g., a single packet).

In some implementations, the data being sent as well as the resequencing data needed to assemble the data transaction is contained within encrypted payloads or encrypted discrete units of data. On the receiving end, cryptographic authentication is then used to verify the integrity of the reconstructed transaction as well as the validity of the sender and receiver.

Stream splitting MTD reduces or eliminates malicious useful information gathering on a plurality of levels. Use of intermediary hosts eliminates gathering data from a single packet that may contain header source and destination information. Information gathering from a single network stream that would normally contain a full conversation will only contain a subset of data from the conversation. In some implementations, the selection of data (e.g., packets) is randomized among a plurality of data streams. Information gathering from a conversation at the application layer is reduced or eliminated by encrypting per chunk at the application layer. In some implementations, this is combined with randomizing the order of packets in the stream.

In some implementations, a path that is experiencing unrecoverable losses and/or has been identified as compromised can be removed from the working plurality of paths. The removal of the path may be done indefinitely or until it has been verified. In some implementations, automated verification of a problematic path may be done by sending and reassembling test data over the path. In some implementations manual intervention is required after a loss to reestablish a valid path.

In some implementations, a minimum diversity is defined and a threshold value of diversity needed for the plurality of paths being used to send the data stream. In some implementations, diversity is defined as a level of distinction between the nodes or hops the data travels through between the different paths. In some implementations, some reduction of diversity is tolerated (e.g., one or more nodes are shared between one or more paths). Some reduction of diversity may be inevitable, especially when using public network systems (e.g., the internet). In some implementations, where a communication protocol is being used that is able to reroute dynamically, calculated values for diversity are only valid for a referenced point in time. In such implementations, the diversity value can be recalculated at different times during a data transmission.

Figure 1:
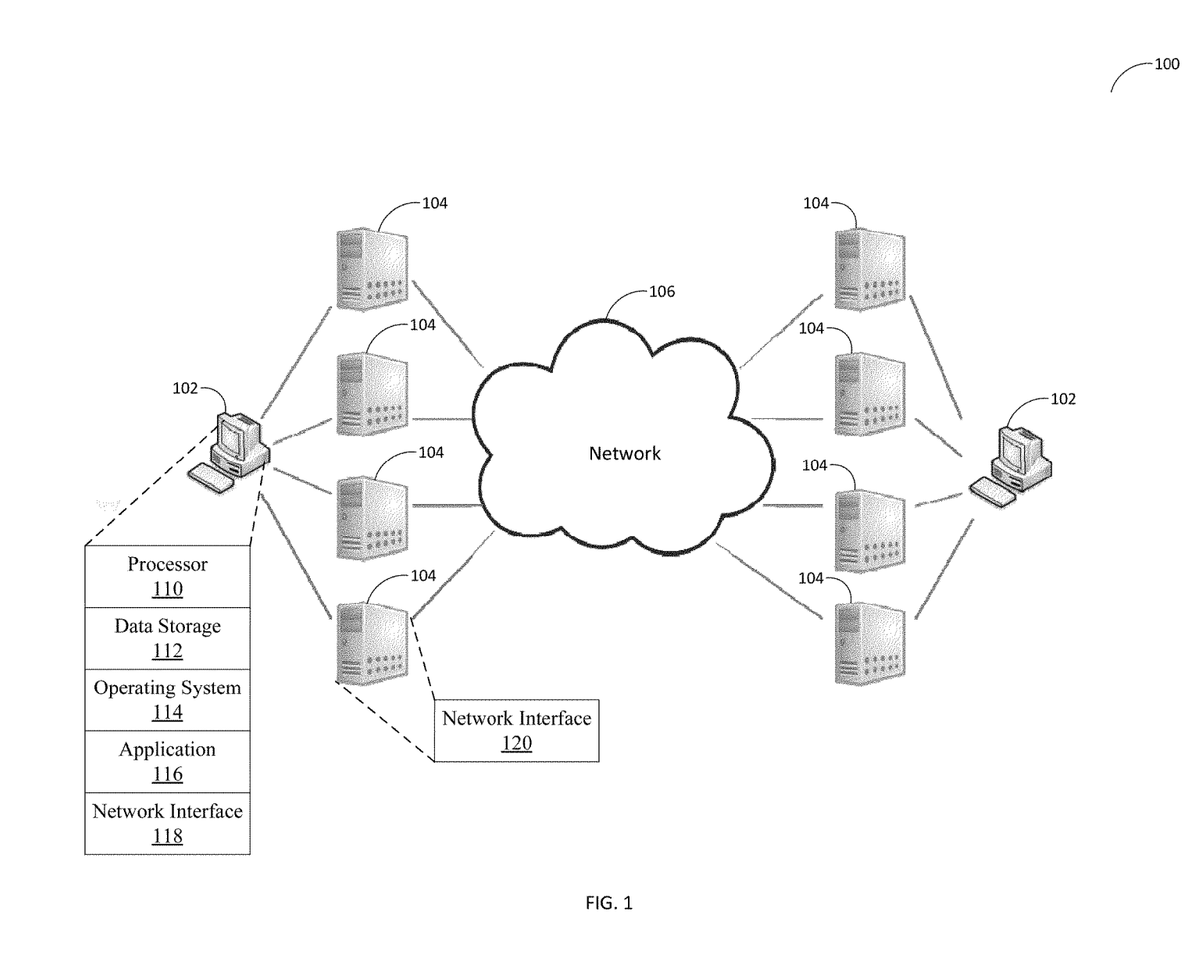
FIG. 1 is a block diagram of an environment for a stream splitting moving target defense.

Referring to FIG. 1, a block diagram of an environment 100 for a stream splitting moving target defense is shown. The environment 100 consists of endpoint nodes 102 connected to a network 106 via intermediary nodes 104. In some implementations, endpoint nodes 102 may comprise any of desktop computers, laptop computers, tablet computers, smart phones, e-readers, set top boxes, game systems, smartwatches, and the like. Intermediary nodes 104 may comprise any of data communication equipment such as modems, hubs, bridges, switches, routers, servers, and the like.

The endpoint nodes 102 are shown to contain a processor 110, data storage 112, an operating system 114, an application 116, and a network interface 118. The data storage 112 may store machine instructions that, when executed by the processor 110, cause the processor 110 to perform one or more of the operations described herein. The processor 110 may include one or more microprocessors, application specific integrated circuits (ASICs), field programmable gate arrays (FPGAs), other forms of processing circuits, or combinations thereof. The data storage 112 may include, but is not limited to, electronic, optical, magnetic, or any other storage or transmission device capable of providing the processor 110 with program instructions. The data storage 112 may include storage devices such as a floppy disk, CD-ROM, DVD, magnetic disk, memory chip, ROM, RAM, EEPROM, EPROM, flash memory, optical media, or any other suitable memory from which the processor 110 can read instructions and/or data. The processor 110 and the data storage 112 may form a processing module. The data storage 112 may include files to run an operating system 114 and an application 116.

In the environment 100, data communication between the end nodes 102 and the intermediate nodes 104 are facilitated by the network 106. In some arrangements, the network 106 includes the internet. In other arrangements or combinations, the network 106 includes a local area network or a wide area network. The network 106 is facilitated by short and/or long range communication technologies including Bluetooth® transceivers, Bluetooth® beacons, RFID transceivers, NFC transceivers, Wi-Fi transceivers, cellular transceivers, microwave transmitters, software radio, wired network connections (e.g., Ethernet), etc.

The end nodes, as shown in FIG. 1, comprise an application 116. In some implementations, the application 116 is configured to be media agnostic and to operate at the application layer, over a variety of protocols, over a variety of media. In some implementations, the application 116 is configured, when not using a stateful lower level protocol (e.g., TCP), to have a dual-layer reassembly algorithm, a full stream reassembly algorithm to focus on the integrity of the full data stream and a sub-stream reassembly algorithm allowing for retransmission of individual units of data (e.g., packets) without triggering a failure of the channel (path). Mediums may include one or multiple physical network connections (e.g., cable and digital subscriber line [DSL]), radio, wireless, cellular, and public switched telephone network, and the like. In some implementations, splitting the full data or data stream over a plurality of medium involves the same chunk, send, reassemble algorithm as other types of stream splitting (e.g., TCP) but the created network sockets are over different physical channels. In some implementations, the endpoint nodes 102 are configured to fail over to one primary medium if a failure of one or multiple other mediums were to occur.

The end nodes 102 and the intermediate nodes 104 are shown to include a network interface 114 and network interface 120 respectively. In some implementations, the network interface 114 and network interface 120 are hardware interfaces allowing data to pass to and from the network 106 (e.g., the internet). In some implementations, the network interface 114 and network interface 120 includes the hardware and logic necessary to communicate over multiple channels of data communication. For example, they may include an Ethernet transceiver, a cellular modem, a BLUETOOTH transceiver, a BLUETOOTH beacon, an RFID transceiver, and/or an NFC transmitter. Data passing through the network interface 114 or the network interface 120 may be encrypted such that the interfaces are secure communication modules.

Figure 2:
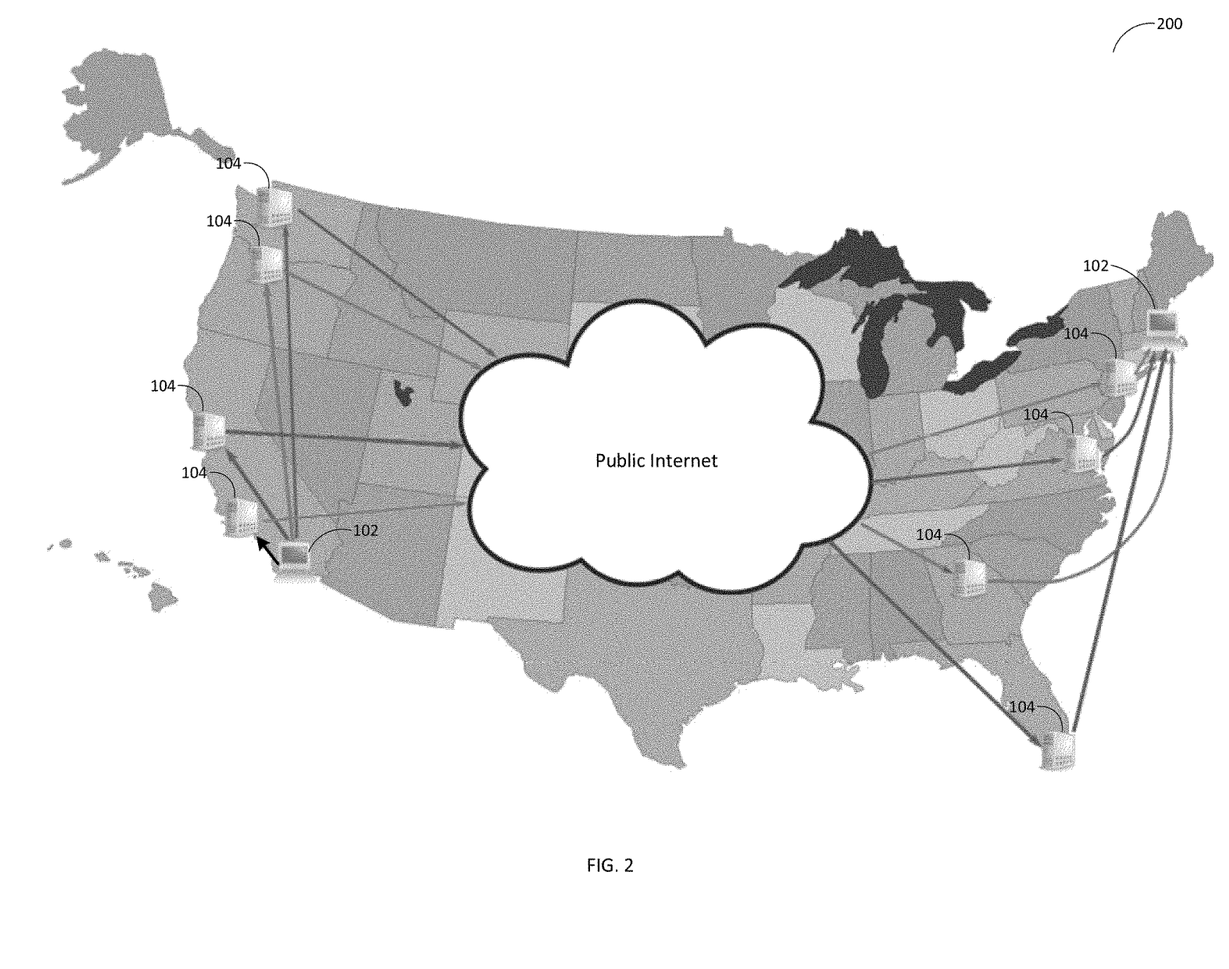
FIG. 2 is a block diagram of an example implementation of an environment for a stream splitting moving target defense.

Referring to FIG. 2, a block diagram of an example implementation of an environment 200 for a stream splitting moving target defense using the public internet is shown. The environment 200 consists of endpoint nodes 102 connected to intermediary nodes 104 over the public internet. Stream splitting in this environment may use TCP SS-MTD and focus on traveling over different paths using TCP/IP (e.g., over the public internet).

Figure 3:
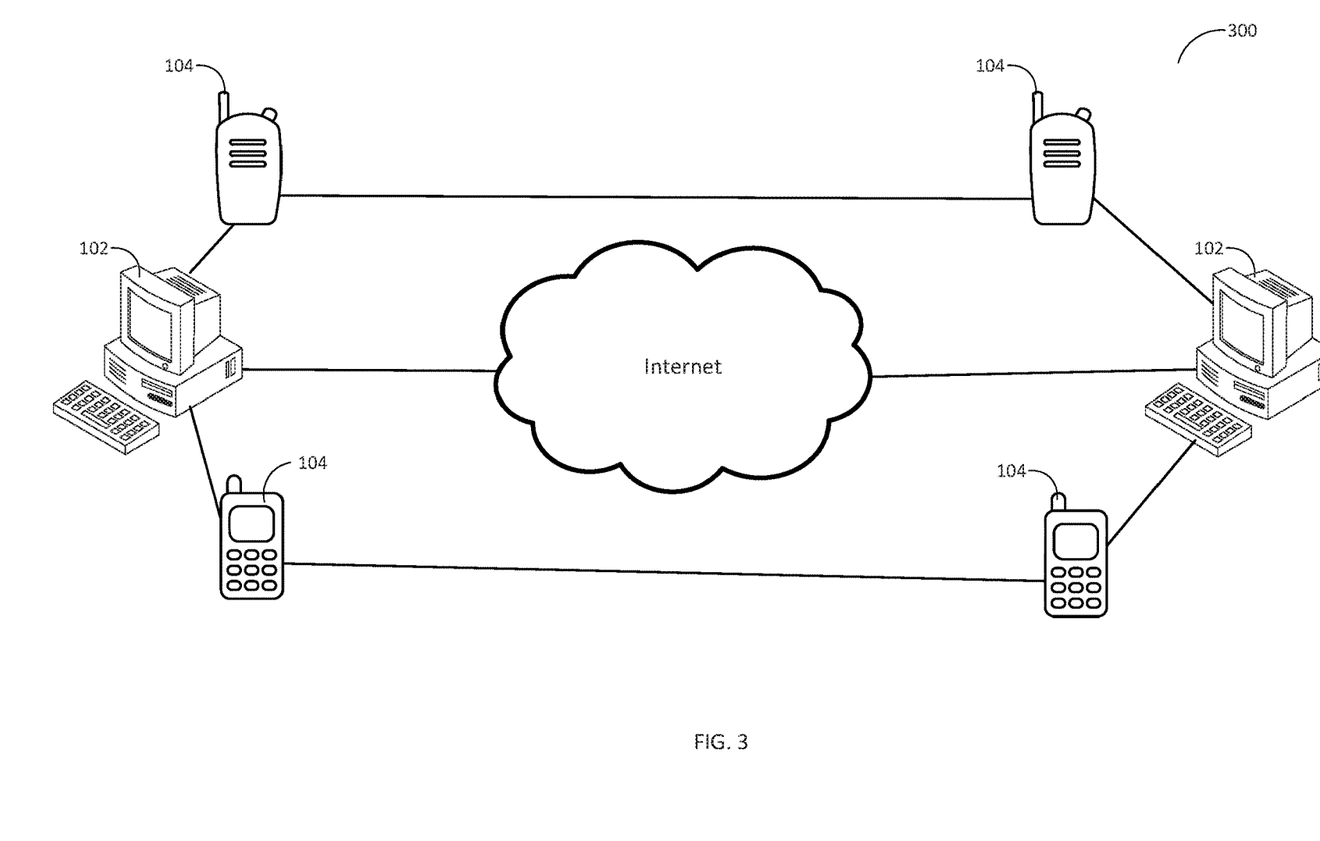
FIG. 3 is a block diagram of an example implementation using a plurality of media.

Referring to FIG. 3, a block diagram of an example implementation using a plurality of media is shown. An environment 300 is shown that consists of endpoint nodes 102 connected to intermediary nodes 104 over the internet. Stream splitting in this environment may use TCP SS-MTD with different paths over a plurality of communications mediums. In some implementations, the endpoint nodes 102 are configured to be media agnostic and to operate at the application layer, over a variety of protocols, over a variety of media. In some implementations, the endpoint nodes are configured, when not using a stateful lower level protocol (e.g., TCP), to have a dual-layer reassembly algorithm, a full stream reassembly algorithm to focus on the integrity of the full data stream and a sub-stream reassembly algorithm allowing for retransmission of individual units of data (e.g., packets) without triggering a failure of the channel (path). Mediums may include one or multiple physical network connections (e.g., cable and digital subscriber line [DSL]), radio, wireless, cellular, and public switched telephone network, and the like. In some implementations, splitting the full data or data stream over a plurality of medium involves the same chunk, send, reassemble algorithm as other types of stream splitting (e.g., TCP) but the created network sockets are over different physical channels. In some implementations, the endpoint nodes 102 are configured to fail over to one primary medium if a failure of one or multiple other mediums were to occur. Failure of one or multiple other mediums may comprise errors in one stream suggesting a compromised medium and/or medium degradation.

Figure 4:
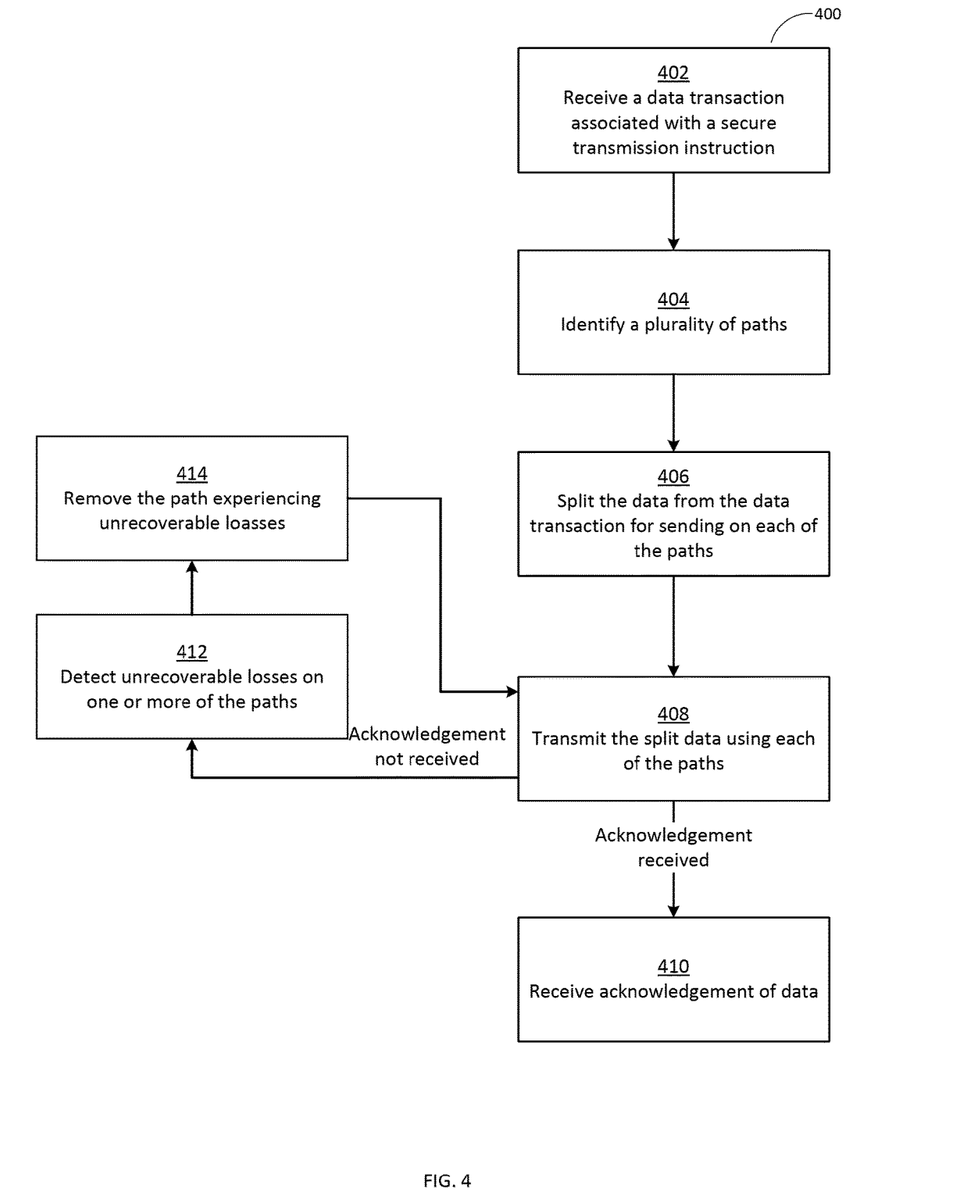
FIG. 4 is a flow diagram of a method of securely transmitting data according to an example implementation.

Referring to FIG. 4, a flow diagram of a method of securely transmitting data according to an example implementation is shown. In some implementations, the method 400 is carried out by processor 110 of an end node 102 executing instructions from a data storage 112 and communicating via a network interface 118 to a network interface 106 of one or more of the intermediate nodes 104. In brief summary of the method, a data transaction associated with a secure transmission instruction is received at 402, a plurality of paths is identified at 404, the data transaction is then split for sending on each of the paths at 406, and the split data is transmitted using each of the paths at 408. If an acknowledgement is received, it is received at 410. If no acknowledgement is received, the unrecoverable losses on one of the paths are detected at 412, the paths experiencing unrecoverable losses are removed at 414, and the split data is re-transmitted at 408.

Still referring to FIG. 4 and in more detail, a data transaction associated with a secure transmission instruction is received at 402. In some implementations, the data transaction comprises a known quantity of data and the secure transmission instruction comprises instructions to send the known quantity of data to another end node 102. In some implementations, the data transaction comprises a data stream and the secure transmission instruction comprises instructions to route the data stream to another end node 102. The secure transmission instruction may include one or more parameters defining the amount of security to use for the data transaction. Parameters may include the use of encryption on the split data to be sent, a number of paths to use, a threshold of a diversity value of the paths to use, a number of attempts to continue to try a path suffering data losses before removal of the path, and the like.

The plurality of paths is identified at 404. In some implementations, each path comprises a unique set of intermediary nodes 104. There may in some cases, be some intermediary nodes 104 that are in more than one set of intermediary nodes 104. In some implementations, at least some specific intermediary nodes are specified for at least one intermediary node of each of the plurality of paths and those specific intermediary nodes are used to obscure the origination and destination of the split quantities of data of the data transaction. In some implementations, details of each path of the plurality of paths is obtained by using tracerouting tools to receive traceroute data. Tracerouting tools may include TCP/ICMP traceroutes, Layer 4 traceroutes, the mapping of IP sinkhole to ASNs to improve knowledge of unknown zones of the paths, and the like.

The data transaction is then split for sending on each of the paths at 406. In some implementations, the data transaction is split down to the level of individual packets. In some implementations, additional units of data (e.g., packets of data) are created containing resequencing data for reconstructing the known quantity of data or data stream. In some implementations, some data for resequencing is included in each of the units of data. In some implementations, the units of data, including any units of data containing resequencing data are encrypted.

The split data is transmitted using each of the plurality of available paths at 408. In some implementations, the units of data are randomized or selected randomly to send through a respective path of the plurality of available paths. In some implementations, failures of transmission of units of data are automatically reattempted.

In some implementations, an acknowledgment is received if there is successful transmission and verification of the data. In some implementations, a verification is not received until the entire data quantity or data stream has been received and verified by the destination end node 102. If there has been successfully transmission and verification an acknowledgement is received at 410. In some implementations, where the units of data have been encrypted, the de-encryption of the data is used to verify the data at the end node 102 through cryptographic verification.

If no acknowledgment and/or verification is received, then there is an attempt to detect unrecoverable losses on one or more of the paths at 412. In some implementations, the end node 102 is able to transmit return data comprising data on which of the one or more of the paths is experiencing data loss, data corruption, or compromised data. Cryptographic verification of portions of the data that was transmitted to the destination end node 102 (e.g., possibly down to the packet level) along with the transmitted resequencing data may identify the one or more of the problem paths.

If there was a detection of unrecoverable losses on one or more of the paths at 412, the path experiencing unrecoverable losses is removed at 414. In some implementations, the path is temporarily removed for use for the current data transaction and any data that was unrecoverable is retransmitted on one of the other one or more paths. In some implementations, the entire data transaction is retransmitted using the rest of the available paths. A new path may be determined to replace the removed path in some circumstances (e.g., the remaining paths do not have enough diversity between their respective nodes).

Figure 5:
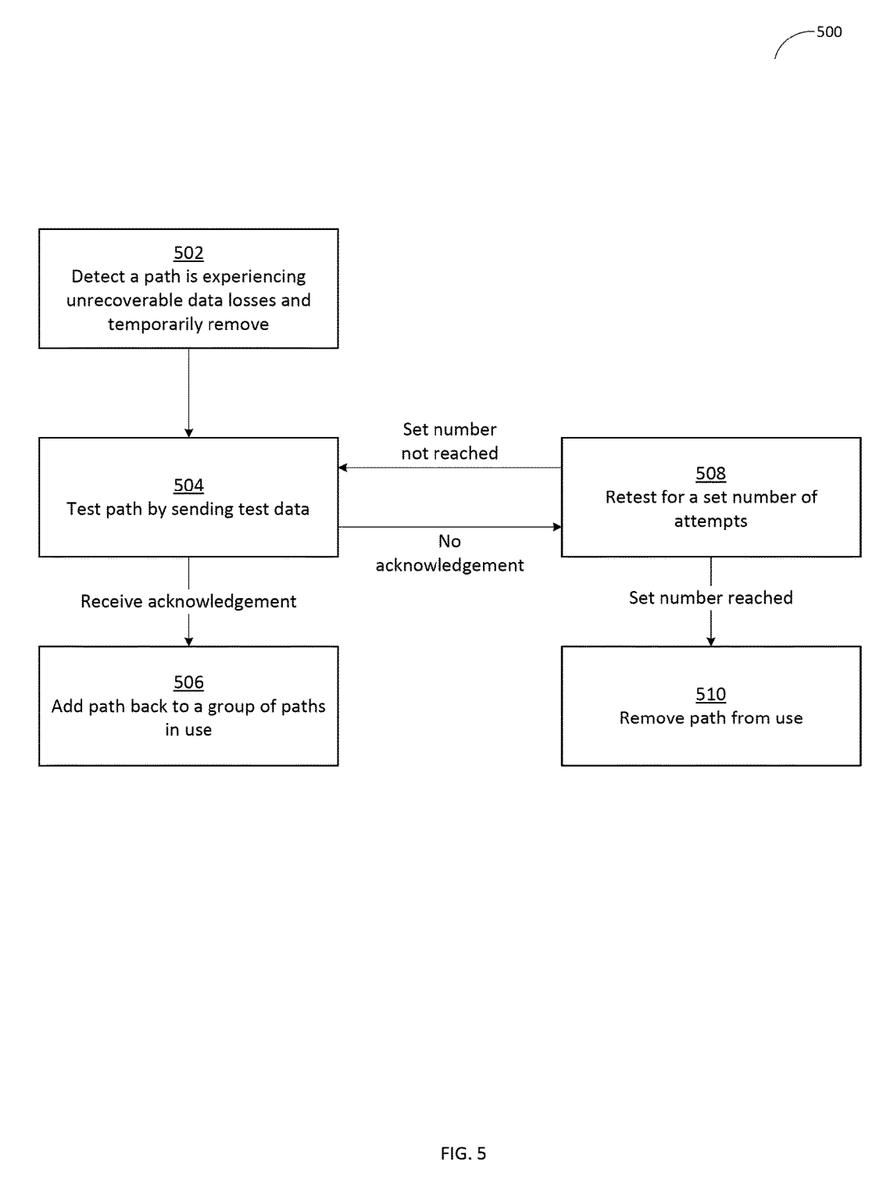
FIG. 5 is a flow diagram of a method of modifying paths used for securely transmitting data according to an example implementation.

Referring to FIG. 5, a flow diagram of a method of modifying paths used for securely transmitting data according to an example implementation is shown. In some implementations, the method 500 is carried out by a processor 110 of an end node 102 executing instructions from a data storage 112 and communicating via a network interface 118 to a network interface 106 of one or more of the intermediate nodes 104. In brief summary of the method, a path experiencing unrecoverable data losses is detected and temporarily removed from use at 502 and the path is tested by sending test data at 504. If an acknowledgement is received, the path is added back to a group of paths in use at 506. If no acknowledgement is received, a retest for a set number of attempts is carried out at 508. If the set number of attempts is reached, the path is removed from use at 510. If the set number of attempts is not reached, the path is tested again by sending test data at 504.

Still referring to FIG. 5 and in more detail, a path experiencing unrecoverable data losses is detected at 502. In some implementations, the end node 102 is able to transmit return data comprising data on which of the one or more of the paths is experiencing data loss, data corruption, or compromised data. Cryptographic verification of portions of the data that was transmitted to the destination end node 102 (e.g., possibly down to the packet level) along with the transmitted resequencing data may identify the one or more of the problem paths. In some implementations, where stateful low level protocols such as TCP do not exist, detection of unrecoverable losses is done by throttling retransmission. Acknowledgement and retransmission rates can be configurable on such media based on application availability requirements.

The path is tested by sending test data at 504. In some implementations, the test data is dummy data used just for the purposes of testing. In some implementations, the test data is the actual data that is part of the transaction data, but is being retried. The test data is sent using the intermediary nodes 104 of the path with the potential problem. In some implementations, only one attempt is made to send test data to test the path with the potential problem. In some implementations, test data is sent for a set number of attempts.

In some implementations, an acknowledgment is received if there is successful transmission and verification of the test data. In some implementations, an acknowledgment is not received until the entire test data quantity or test data stream has been received and verified by the destination end node 102. In some implementations, if an acknowledgement is received, the path is added back to a group of paths in use at 506. The path may be added back in to the group of paths for further use in the original data transaction and/or put back in to the group of pads for further use in further data transactions. In some implementations, acknowledgment and verification is received separately (e.g., there is an acknowledgment that data was received, but no verification because the data that was received was corrupted).

If no acknowledgement is received, a retest for a set number of attempts is carried out at 508. In some implementations, one attempt is made to send test data to test the path that may be experiencing unrecoverable data loss. In some implementations, a set amount of attempts is specified and additional test data is sent until the set amount of attempts is reached while there is still no acknowledgment received.

If the set number of attempts is reached, the path is removed from use at 510. In some implementations, the removal of the path may be done indefinitely or until it has been verified. In some implementations, automated verification of a problematic path may be done by sending and reassembling test data over the path. In some implementations manual intervention is required after a loss to reestablish a valid path. The removal of the path may be done indefinitely or until it has been verified. In some implementations, automated verification of a problematic path may be done by sending and reassembling test data over the path. In some implementations manual intervention is required after a loss to reestablish a valid path. If the set number of attempts is not reached, the path is tested again by sending test data at 504.

Figure 6:
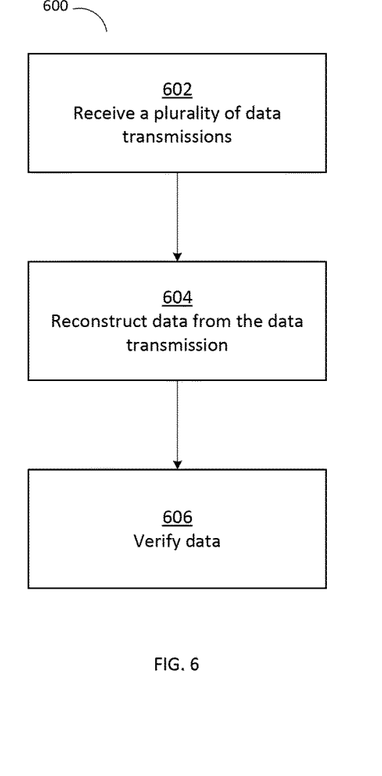
FIG. 6 is a flow diagram of a method of receiving securely transmitted data according to an example implementation.

Referring to FIG. 6, a flow diagram of a method of receiving securely transmitted data according to an example implementation is shown. In some implementations, the method 600 is carried out by a processor 110 of an end node 102 executing instructions from a data storage 112 and communicating via a network interface 118 to a network interface 106 of one or more of the intermediate nodes 104. In brief summary of the method 600, a plurality of data transmissions are received at 602, the data from the transmissions are reconstructed at 604, and the data is verified at 606.

Still referring to FIG. 6 and in more detail, a plurality of data transmissions are received at 602. In some implementations, the data transmissions are composed of data units arriving over different paths with some of the data units containing resequencing data for use in reconstructing the full quantity of data or the full data stream. In some implementations, each of the data units comprise some resequencing data. In some implementations, the data units (including any data units that may contain resequencing data) arrive encrypted.

The data from the transmissions are reconstructed at 604. In some implementations, the data units or the data overall must first be decrypted to use in reconstruction of the full quantity of data or the full data stream. In some implementations, resequencing data used in reconstruction is contained in one or more of the data units comprising the full quantity of data. In some implementations, there is some data in each of the data units to be used in reconstructing the data.

The data is verified at 606. In some implementations, verification includes one or more checking to see if all data units identified from the resequencing data have been received, and cryptographic verification. Other verification methods may be used alone or in conjunction, such as checksums, parity bits, cyclic redundancy checks, and the like.

Figure 7:
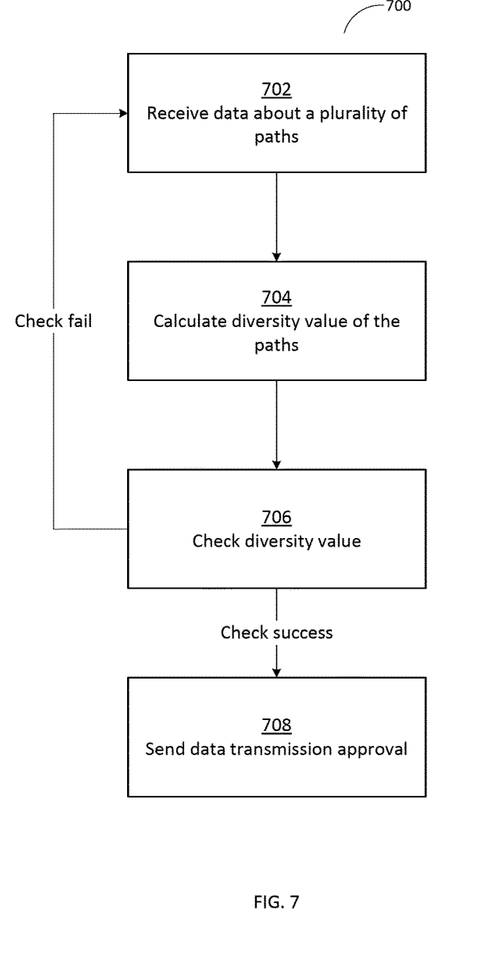
FIG. 7 is a flow diagram of a method of using paths by calculating diversity according to an example implementation.

Referring to FIG. 7, a flow diagram of a method of using paths by calculating diversity according to an example implementation is shown. In some implementations, the method 700 is carried out by a processor 110 of an end node 102 executing instructions from a data storage 112 and communicating via a network interface 118 to a network interface 106 of one or more of the intermediate nodes 104. In brief summary of the method 700, data about a plurality of paths is received at 702, the diversity value of the paths is calculated at 704, and the diversity value is checked at 706. If the check is a success, the data transmission approval is sent at 708 prior to transmission of data. If the check is a fail, the method 700 re-starts at 702.

Still referring to FIG. 7 and in more detail, data about a plurality of paths is received at 702. In some implementations, data about the plurality of paths includes information about the set of individual intermediary nodes 104 that make up the connection points of each of the plurality of paths. In some implementations, the data is incomplete and one or more of the paths of the plurality of paths have the information of some of the set but not all of the intermediate nodes 104 that make up the set. Additional information may be received about the plurality of paths including the medium of the path, compatible communication protocols, types of devices that make up the intermediary nodes 104 of the path, and the like.

The diversity value of the paths is calculated at 704. In some implementations, the set of intermediate nodes 104 that make up the paths may contain intermediate nodes 104 that are the same between sets. A value of the diversity of the paths may be calculated. In some implementations, the diversity can be described as the following:

For each path or sub-stream, we have a set of intermediate nodes 104 or hops that data travels along. For a best case value of the diversity, these intermediate nodes 104 are all distinct sets $$s_a=\{a_1,a_2,a_3,\ldots\}, s_b=\{b_1,b_2,b_3,\ldots\}, s_c=\{c_1,c_2,c_3,\ldots\}\ldots$$

However, in many cases when using public Internet transit, there will be some intersection M of sets $s_a$, $s_b$, $s_c$, etc. This intersection M represents desirable intermediate nodes 194 to attack or gather traffic from, as these intermediate nodes 104 will have more than one sub-stream traversing them.

$$M=(s_a \cap s_b) \cup (s_a \cap s_c) \cup (s_b \cap s_c) \ldots$$

In some implementations, data about known potentially hostile intermediate nodes 104, is used to augment the calculation of the diversity quotient (e.g., a value of diversity). In one implementations, an approach is to weight potentially hostile intermediate nodes 104 that exist in set M such that the denominator of Q would have to grow to improve the diversity quotient given the existence of hostile intermediate nodes 104 in any sub-stream, and more when hostile intermediate nodes 104 were present in M.

$$H_{known}=\{h_1,h_2,h_3\ldots\}$$

In some implementations, hostile intermediate nodes 104 that appear in more than one sub-stream or path are additionally weighted.

$$H = H_{known} \cap \bigcup_{x=1}^{n} S_x$$

In some implementations, additional weight is given to hostile $H_M=H \cap M$ intermediate nodes 104 Or, when enough information is known, we may give additional weight to hostile nodes by the number of sub-streams or paths they intersect, as represented by $H_2$ and $H_3$ and so forth.

$$S=\{s_1,s_2,s_3,\ldots\}$$

$$H_3=\{h|h \in s_x \cap s_y \cap s_z\} \forall (x,y,z) \in [S]^3$$

$$H_2=\{h|h \in s_x \cap s_y\} \forall (x,y) \in [S]^2$$

Additional weights may be added to intermediate nodes 104 for other reasons. For instance, additional weights c and d to give to $H_2$ and $H_3$ and so forth.

$$Q = \frac{|M|+|H|+c|H_2|+d|H_3|\ldots}{\left|\bigcup_{x=1}^{n} S_x\right|}$$

In some implementations, the diversity quotient Q (e.g., a value of the diversity), as defined above, is only valid for a point in time, T In one example, when a TCP protocol is used, since the TCP protocol is able to reroute dynamically, Q will naturally change across the duration of time that a stream is being transmitted across the network. Since the TCP protocol is able to reroute dynamically, Q will naturally change across the duration of time that a stream is being transmitted across the network. In some implementations, a vale for the diversity is calculated at different times during transmission, or to expand the number of intermediary hosts at network handshake time based on the calculated value of T at the beginning of the stream.

Since the TCP protocol is able to reroute dynamically, Q will naturally change across the duration of time that a stream is being transmitted across the network. It may be desirable to recalculate Q at different times during transmission, or to expand the number of intermediary hosts at network handshake time based on the calculated value of T at the beginning of the stream.

The diversity value is checked at 706. In some implementations, the diversity value must meet a certain threshold or required level for approval of data transmission. In some implementations, the diversity value is calculated at the launch of a data transmission and compared to a predetermined or preconfigured threshold value. If the check is a fail, the method 700 re-starts at 702. In some implementations, an attempt is made to increase the value of the diversity before trying again by adjusting the number of sub-streams or paths. Either a decrease or increase in paths may result in greater diversity. For example, if the intermediate nodes 104 acting as intermediary host is limited, an increase in number of paths may actually decrease diversity. In some implementations, on-demand cloud provisioning is utilized to increase intermediary host quantity and geographical diversity (many cloud providers allow a user to choose geographical locality).

If the check of the diversity value is a success, the data transmission approval is sent at 708. In some implementations, the data transmission approval has to be sent and received by a component of the end node 102 (e.g., network interface 118) prior to any data sent. In some implementations, the data transmission cannot begin and/or continue without receiving the data transmission approval due to a successful check of the diversity value against a threshold value.

The above-described systems and methods provide enhanced system and data security with minimal end user impact compared to non-split-stream MTD computing environments. The described split stream MTD computing environments provide the enhanced computer system communication system security by splitting a data stream in to a plurality of paths is described. Stream splitting MTD helps ensure confidentiality and integrity protection for communications channels. The use of redundant links in the systems and methods or utilizing stream splitting MTD allows for constant uptime testing as well as seamless failover for any compromised or degraded communications links. In some implementations, the split streams utilize a plurality of channels in a single medium. In other implementations, the split streams utilize a plurality of mediums. In some implementations, a combination of channels as well as mediums is utilized. In some implementations, Stream splitting MTD, involves splitting a single data stream (e.g., TCP stream) into a plurality of discrete units, then sending and receiving those discrete units from and to different (ideally geographically disparate) receiving servers, with the stream being reassembled on the receiving end. The plurality of discrete units of data include resequencing data. The size of each discrete unit may vary depending on the specific implementation, even down to small unit sizes (e.g., a single packet).

As noted above, implementations within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable or non-transitory storage media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Implementations have been described in the general context of method steps which may be implemented in one implementation by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of executable instructions or associated data structures represents examples of corresponding acts for implementing the functions described in such steps.

As previously indicated, implementations may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Implementations may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the implementations might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes and omissions may be made in the design, operating conditions and arrangement of the implementations without departing from the scope of the present disclosure as expressed in the appended claims.

What is claimed is:

1. A method executing on a first computing system comprising:
   receiving a data transaction associated with a secure transmission instruction to transmit first data of the data transaction to a second computing system;
   identifying a plurality of paths, each comprising one or more nodes, that allow for data transmission between the first computing system and the second computing system;
   splitting the first data into a plurality of data payloads, the plurality of data payloads including data payloads containing resequencing data;
   transmitting one or more of the plurality of data payloads to the second computing system using each of the plurality of paths;
   detecting one of the plurality of paths has unrecoverable losses;
   removing the one of the plurality of paths from the plurality of paths consequent to detecting the one of the plurality of paths has unrecoverable losses;
   retransmitting a respective data payload of the plurality of data payloads using the one of the plurality of paths using another of the plurality of paths or a new path that allows for data transmission between the first computing system and the second computing system;
   automatically transmitting test data using the one of the plurality paths consequent to detecting the one of the plurality of paths has unrecoverable losses;

receiving an acknowledgement, from the second computing system, verifying the integrity of a reconstruction of the test data; and re-adding the one of the plurality of paths to the plurality of paths consequent to receiving the acknowledgement.

2. The method of claim 1, further comprising:

encrypting each of the plurality of data payloads prior to transmitting the one or more of the plurality of data payloads to the second computing system using each of the plurality of paths; and receiving an acknowledgement, from the second computing system, verifying the integrity of a reconstruction of the first data of the data transaction using cryptographic authentication.

3. The method of claim 1, further comprising each of the plurality of data payloads comprising a transmission control protocol (TCP) stream.

4. The method of claim 1, further comprising randomizing the plurality of data payloads and grouping the randomized plurality of data payloads in to sets, each of the one or more of the plurality of data payloads transmitted to the second computing system one of the sets.

5. The method of claim 1, further comprising calculating a diversity value of the plurality of paths, the diversity value based on a uniqueness of the one or more nodes of each of the plurality of paths, the transmission of the one or more of the plurality of data payloads to the second computing system dependent on the diversity value of the plurality of paths being under a threshold value.

6. A computing system comprising one or more processors and a memory coupled to the one or more processors, the memory comprising instructions that when executed cause the computing system to:

receive, by the computing system, a data transaction associated with a secure transmission instruction to transmit first data of the data transaction to a second computing system;

identify, by the one or more processors, a plurality of paths, each comprising one or more nodes, that allow for data transmission between the computing system and the second computing system;

calculate, by the one or more processors, a diversity value of each of the plurality of paths, the diversity value based on a uniqueness of the one or more nodes of each of the plurality of paths;

split, by the one or more processors, the first data into a plurality of data payloads, the plurality of data payloads including data payloads containing resequencing data; and transmit, by the computing system, one or more of the plurality of data payloads to the second computing system using each of the plurality of paths dependent on the diversity value for each of the plurality of paths being under a threshold value.

7. The computing system of claim 6, further comprising instructions that when executed cause the computing system to:

encrypt, by the one or more processors, each of the plurality of data payloads prior to transmitting the one or more of the plurality of data payloads to the second computing system using each of the plurality of paths; and receive, by the computing system, an acknowledgement, from the second computing system, verifying the integrity of a reconstruction of the first data of the data transaction using cryptographic authentication.

8. The computing system of claim 6, further comprising each of the plurality of data payloads comprising a transmission control protocol (TCP) stream.

9. The computing system of claim 6, further comprising instructions that when executed cause the computing system to randomize, by the one or more processors, the plurality of data payloads and group, by the one or more processors, the randomized plurality of data payloads in to sets, each of the one or more of the plurality of data payloads transmitted to the second computing system one of the sets.

10. The computing system of claim 6, further comprising instructions that when executed cause the computing system to:

detect, by the one or more processors, one of the plurality of paths has unrecoverable losses;

remove, by the one or more processors, the one of the plurality of paths from the plurality of paths consequent to detecting the one of the plurality of paths has unrecoverable losses; and retransmit, by the computing system, the one or more of the plurality of data payloads using the one of the plurality of paths using another of the plurality of paths or a new path that allows for data transmission between the computing system and the second computing system.

11. The computing system of claim 10, further comprising instructions that when executed cause the computing system to:

automatically transmit, by the computing system, test data using the one of the plurality of paths consequent to detecting the one of the plurality of paths has unrecoverable losses;

receive, by the computing system, an acknowledgement, from the second computing system, verifying the integrity of a reconstruction of the test data; and re-add, by the one or more processors, the one of the plurality of paths to the plurality of paths consequent to receiving the acknowledgement.

12. A non-transient, computer-readable media comprising instructions when executed on one or more processors cause the one or more processors to perform a method comprising:

receiving a data transaction associated with a secure transmission instruction to transmit first data of the data transaction to a second computing system;

identifying a plurality of paths, each comprising one or more nodes, that allow for data transmission between the first computing system and the second computing system;

splitting the first data into a plurality of data payloads, the plurality of data payloads including data payloads containing resequencing data;

transmitting one or more of the plurality of data payloads to the second computing system using each of the plurality of paths detecting one of the plurality of paths has unrecoverable losses;

removing the one of the plurality of paths from the plurality of paths consequent to detecting the one of the plurality of paths has unrecoverable losses;

retransmitting a respective data payload of the plurality of data payloads using the one of the plurality of paths using another of the plurality of paths or a new path that allows for data transmission between the first computing system and the second computing system;

automatically transmitting test data using the one of the plurality paths consequent to detecting the one of the plurality of paths has unrecoverable losses;

receiving an acknowledgement, from the second computing system, verifying the integrity of a reconstruction of the test data; and re-adding the one of the plurality of paths to the plurality of paths consequent to receiving the acknowledgement.

13. The non-transient, computer-readable media of claim 12 further comprising instructions to perform the method comprising:

encrypting each of the plurality of data payloads prior to transmitting the one or more of the plurality of data payloads to the second computing system using each of the plurality of paths; and receiving an acknowledgement, from the second computing system, verifying the integrity of a reconstruction of the first data of the data transaction using cryptographic authentication.

14. The non-transient, computer-readable media of claim 12, further comprising each of the plurality of data payloads comprising a transmission control protocol (TCP) stream.

15. The non-transient, computer-readable media of claim 12 further comprising instructions to perform the method comprising randomizing the plurality of data payloads and grouping the randomized plurality of data payloads in to sets, each of the one or more of the plurality of data payloads transmitted to the second computing system one of the sets.

* * * * *